(12) United States Patent
Jun et al.

(10) Patent No.: US 9,362,744 B2
(45) Date of Patent: Jun. 7, 2016

(54) SERIAL LOADING CONSTANT POWER SUPPLY SYSTEM

(71) Applicant: Electronics and Telecommunications Research Institute, Daejeon (KR)

(72) Inventors: Yong il Jun, Daejeon (KR); Sang Choon Ko, Daejeon (KR); Jae Kyoung Mun, Daejeon (KR); Dae Woo Lee, Daejeon (KR); Kyu-Seok Lee, Daejeon (KR); Ho Young Kim, Daejeon (KR); Chul Won Ju, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 473 days.

(21) Appl. No.: 14/040,102

(22) Filed: Sep. 27, 2013

(65) Prior Publication Data

US 2014/0097685 A1    Apr. 10, 2014

(30) Foreign Application Priority Data

Sep. 27, 2012  (KR) .................. 10-2012-0108175
Sep. 25, 2013  (KR) .................. 10-2013-0113746

(51) Int. Cl.
*H02J 3/00* (2006.01)
*H02J 1/04* (2006.01)
(Continued)

(52) U.S. Cl.
CPC .. *H02J 1/04* (2013.01); *H02H 3/20* (2013.01); *H02H 7/10* (2013.01); *H02M 2001/0074* (2013.01); *H02M 2001/0087* (2013.01); *Y10T 307/406* (2015.04)

(58) Field of Classification Search
CPC ............... H02H 7/10; H02H 3/20; H02J 1/04; H02M 2001/0074; H02M 2001/0087; Y10T 307/406
USPC ............................................. 307/31
See application file for complete search history.

(56) References Cited

U.S. PATENT DOCUMENTS 7,902,768 B2    3/2011  Zanforlin
2008/0106248 A1    5/2008  Qahouq et al.
(Continued)

FOREIGN PATENT DOCUMENTS

KR    10-2005-0078178 A    8/2005
KR    10-2011-0057359 A    6/2011

OTHER PUBLICATIONS

William Tschudi, "DC Power for Improved Data Center Efficiency", Lawrence Berkeley National Laboratory, Mar. 2008, pp. 1-74.
(Continued)

*Primary Examiner* — Rexford Barnie
*Assistant Examiner* — Toan Vu

(57) ABSTRACT

The inventive concept relates to a system supplying a constant current direct current power to serial loads connected in series with one another.
The inventive concept is constituted by a constant current source power supply unit outputting a predetermined direct current, a load connection unit having the same rated current characteristic as the constant current source, a load connection unit having a rated current characteristic smaller than the constant current source, a load connection unit having a rated current characteristic greater than the constant current source, a load connection unit having a rated current characteristic greater or smaller than the constant current source and a circuit controlling or protecting them.

15 Claims, 7 Drawing Sheets

(51) Int. Cl.
*H02H 3/20* (2006.01)
*H02H 7/10* (2006.01)
*H02M 1/00* (2006.01)

(56) References Cited

U.S. PATENT DOCUMENTS

| | | |
|---|---|---|
| 2010/0327831 A1 | 12/2010 | Nishida |
| 2011/0109292 A1 | 5/2011 | Jang et al. |
| 2012/0212146 A1 | 8/2012 | Hwang et al. |
| 2014/0035371 A1* | 2/2014 | Weir ................. H02J 4/00 307/36 |

OTHER PUBLICATIONS

Brian Hughes et al., "GaN HFET Switching Characteristics at 350V/20A and Synchronous Boost Converter Performance at 1MHz", 21th APEC, Feb. 2012, pp. 2506-2508, IEEE.

* cited by examiner

SERIAL LOADING CONSTANT POWER SUPPLY SYSTEM

CROSS-REFERENCE TO RELATED APPLICATIONS

This U.S. non-provisional patent application claims priority under 35 U.S.C. §119 of Korean Patent Application No. 10-2012-0108175, filed on Sep. 27, 2012 and No. 10-2013-0113746, filed on Sep. 25, 2013, the entire contents of which are hereby incorporated by reference.

BACKGROUND OF THE INVENTION

The present invention relates to power supply systems, and more particularly, to a serial loading constant current power supply system.

Information and Communication Technology (ICT) equipment and facility have power conversion process of four to sixth steps and thereby their power efficiency is very low.

To overcome the above-mentioned the efficiency problem, Lawrence Berkeley National Laboratory carried out a study on a direct current feeding ICT power supply system. The study report issued in 2006 has claim that the power efficiency improvement is maximum 35%.

ITU-T tries to standardize a DC power feeding system standard for an information communication device to reflect the attempts to solve the problem.

However, the efforts to develop a DC power feeding technology known until now adopts a constant voltage, parallel loading scheme, similar to a conventional AC power feeding system.

One of the problems of the conventional technology is such that since a large pulsating current according to a loading status flows through a feeding line having a relatively great antenna radiation effective area, it radiates a strong electromagnetic interference (EMI) noise to disturb a normal operation of a load electronic/power device. To block out the EMI noise radiation in the power feeding system, a capacitor and an inductor which are expensive and have a large size are needed and thereby their cost increases. Also, additional costs occur to block out the EMI noise.

Another problems of the conventional technology is such that in a LED lightning being widely used these days, since the property of load itself is a constant current property, if using a conventional constant voltage power feeding, an additional power converting device converting a voltage into a current source is needed. This acts as a factor hindering an energy efficiency advantage of LED itself. Thus, overall luminous efficiency of a LED lighting including power feeding circuits has a similar level compare to the fluorescent lighting.

A high performance computer has several processors. A recent high performance individual processor requires very high fluctuating drive current. However, a drive voltage being required is about 1 Volt is very low. A voltage regulator module (VRM) being used in the high performance processor is very expensive to occupy 25~30% of a processor price, has physically a large volume and has approximately power conversion efficiency of about 80% and thereby it has problems of price and reliability.

SUMMARY

Embodiments of the inventive concept provide a serial loading, constant current DC power supply system. The serial loading, constant current DC power supply system may include a power supply unit comprising a constant current source outputting a direct current; a constant current converter having the same rated current characteristic as the constant current source; a buck current converter having a rated current characteristic smaller than the constant current source; a boost current converter having a rated current characteristic greater than the constant current source; a buck-boost current converter having a rated current characteristic greater or smaller than the constant current source; current converting controllers controlling the current converters; and a protection circuit for protecting the current converters.

BRIEF DESCRIPTION OF THE FIGURES

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF PREFERRED EMBODIMENTS

Figure 1:
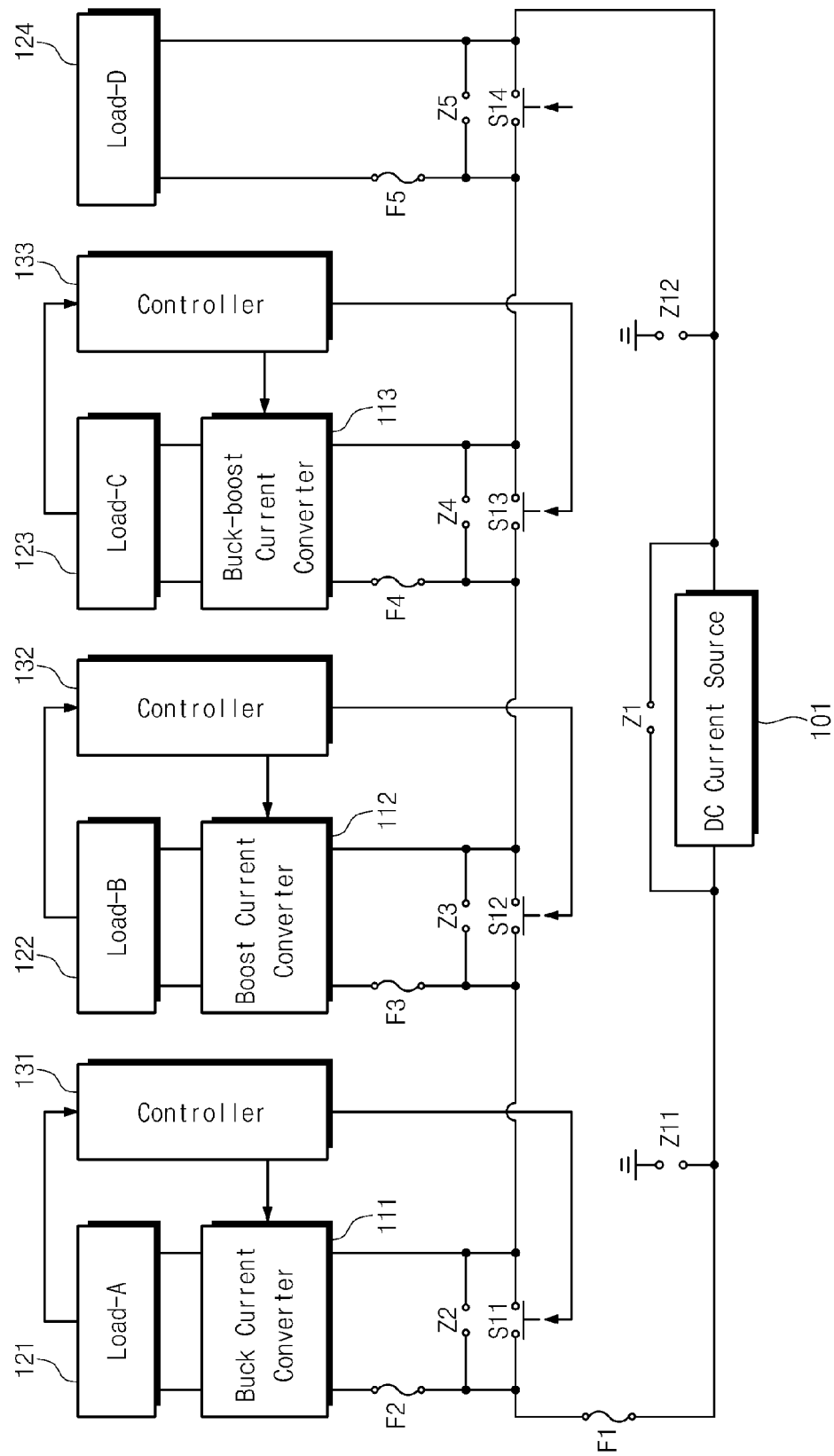
FIG. 1 is a drawing illustrating a serial loading, constant current source, direct current power supply system in accordance with the inventive concept.

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

The inventive concept provides a serial loading, constant current source, direct current power supply system. The inventive concept defines essential functional elements for constituting the power supply system having low noise and high efficiency characteristics and provides an interaction between the functional elements. The inventive concept suggests continuity maintenance techniques of the power supply's feeding line, and a detailed scheme and an operation of a supply switch. The inventive concept also suggests a control circuit and an operation of a current converter being used in the power supply system. The inventive concept also suggests new types of current converting circuits being used in the power supply system.

FIG. 1 is a drawing illustrating a serial loading, constant current source, direct current power supply system in accordance with the inventive concept.

Referring to FIG. 1, a constant current source 101 can output the quantity of currents within a preset allowable range. In the case that a voltage exceeding a preset allowable range is applied, over-voltage breakers Z1, Z11 and Z12 are conducted.

In the case that a current exceeding a preset allowable range flows, an over-current breaker F1 is broken.

The constant current source 101 has an operation control switch that can switch an operation of the constant current source 101 therein. The over-voltage breakers Z11 and Z12 are connected between a ground and a power supply feeding line passing through the constant current source 101, the over-current breaker F1 and supply switches S11~S14. The over-voltage breaker Z1 is connected in parallel with an output stage of the constant current source 101.

The over-current breaker F1 is connected in series with a common terminal of the over-voltage breaker Z1 and the constant current source 101. In the case that an over current occurs in the power supply feeding line passing through the constant current source 101, the over current breaker F1 and supply switches S11~S14, the over-current breaker F1 is broken to cut off a current flow in the power supply feeding line.

In the case that an overvoltage occurs in the power supply feeding line passing through the constant current source 101, the over-current breaker F1 and supply switches S11~514, the over-voltage breakers Z11 and Z12 are conducted to maintain the voltage between the power supply feeding line and a ground below a specification.

In the case that an overvoltage is applied to an output stage of the constant current source 101, the over-voltage breaker Z1 is conducted to limit the output voltage of the constant current source 101 below a specification.

A load 121 always consumes a quantity of currents equal to or smaller than the specified quantity of currents which the constant current source outputs. The buck current converter 111 converts the current flowing through the power supply feeding line into a load current of the load 121.

A buck current converting controller 131 supplies a switching signal to the buck current converter 111 on the basis of signal being supplied from the load 121 to control the quantity of output currents.

In the case that the quantity of currents being consumed in the load 121 or the buck current converter 111 exceeds a specification, the over-current breaker F2 is broken.

In the case that an overvoltage is applied to the input ports of the buck current converter 111, the over-voltage breaker Z2 is conducted.

The supply switch S11 is closed when the over-current breaker F2 is broken, an operation current of the load 121 through the buck current converter 111 is smaller than a specification, a signal P23 being applied from the buck current converting controller 131 is active, or the buck current converter 111 or the load 121 is not mounted on the supply system. The supply switch S11 is open when the buck current converter 111 or the loads 121 are mounted on the supply system to operate.

A constant current being supplied from the constant current source 101 flows into the input ports of the buck current converter 111 connected in series with the over-current breaker F2 through the over-current breaker F1 and supply switches S12~S14.

The over-voltage breaker Z2 and the supply switch S11 are connected in parallel with the input port of the buck current converter 111 and the over-current breaker F2. The buck current converter 111 is connected in parallel with the load 121.

The state signal output-port of the load 121 is connected to the load state signal input-port of the buck current converting controller 131.

In the case that the load 121 is not mounted, the load state signal input-port of the buck current converting controller 131 has to generate "NULL" signal autonomously. The buck current converter switching signal of the buck current converting controller 131 is connected to the switching signal input-port of the buck current converter 111.

A circuit constituted by the load 121 consuming the quantity of currents equal to or smaller than the quantity of output currents of the constant current source, the buck current converter 111 that transforms a power supply feeding line current to a load 121 current, the buck current converting controller 131 controlling the buck current converter 111, the over-current breaker F2 and the over-voltage breaker Z2 protecting the power supply feeding line and the supply switch S11 connecting or cutting off a power flow to the load 121, and interactions there between are described above.

A load 122 always consumes a quantity of currents equal to or greater than the specified quantity of currents which the constant current source 101 outputs.

A boost current converter 112 converts the current flowing through the power supply feeding line into a load current of the load 122. A boost current converting controller 132 supplies a switching signal to the boost current converter 112 on the basis of signal being supplied from the load 122 to control the quantity of output currents.

The boost current converter 112 converts the current flowing through the power supply feeding line into a load current of the boost current converter 122.

The boost current converting controller 132 supplies a switching signal to the boost current converter 112 on the basis of signal being supplied from the load 122 to control the quantity of output currents.

In the case that the quantity of currents being consumed in the load 122 or the boost current converter 112 exceeds a specification, the over-current breaker F3 is broken.

In the case that an overvoltage is applied to the input ports of the boost current converter 112, an over-voltage breaker Z3 is conducted.

The supply switch S12 is closed when the over-current breaker F3 is broken, an operation current of the load 122 through the boost current converter 112 is smaller than a specification, a signal P23 being applied from the boost current converting controller 132 is active, or the boost current converter 112 or the load 122 is not mounted on the supply system. The supply switch S12 is open when the boost current converter 112 or the load 122 is mounted on the supply system to operate.

A constant current being supplied from the constant current source 101 flows into the input ports of the boost current converter 112 connected in series with the over-current breaker F3 through the over-current breaker F1 and supply switches S11, S13 and S14.

The over-voltage breaker Z3 and the supply switch S12 are connected in parallel with the input ports of the boost current converter 112 and the over-current breaker F3. The boost current converter 112 is connected in parallel with the input ports of the load 122.

The state signal output-port of the load 122 is connected to the load state signal input-port of the boost current converting controller 132. In the case that the load 122 is not mounted, the load state input-port of the boost current converting controller 132 has to generate "NULL" signal autonomously. The boost current converter switching signal of the boost current converting controller 132 is connected to a switching signal input-port of the boost current converter 112.

A circuit constituted by the load 122 consuming the quantity of currents equal to or greater than the quantity of output currents of the constant current source, the boost current converter 112 that transforms a power supply feeding line constant current to a load 122 current, the boost current converting controller 132 controlling the boost current converter 112, the over-current breaker F3 and the over-voltage breaker Z3 protecting the power supply feeding line and the supply switch S12 connecting or cutting off a power flow to the load 122, and interactions there between are described above.

A load 123 always consumes a quantity of currents smaller or greater than the specified quantity of currents which the constant current source 101 outputs.

A buck-boost current converter 113 converts the current flowing through the power supply feeding line into a load current of the load 123.

A buck-boost current converting controller 133 supplies a switching signal to the buck-boost current converter 113 on the basis of signal being supplied from the load 123 to control the quantity of output currents.

In the case that the quantity of currents being consumed in the load 123 or the buck-boost current converter 113 exceeds a specification, an over-current breaker F4 is broken.

In the case that an overvoltage is applied to an input port of the buck-boost current converter 113, an over-voltage breaker Z4 is conducted.

The supply switch S13 is closed when the over-current breaker F4 is broken, an operation current of the load 123 through the buck-boost current converter 113 is smaller than a specification, a signal P23 being applied from the buck-boost current converting controller 133 is active, or the buck-boost current converter 113 or the load 123 is not mounted on the supply system. The supply switch S13 is open when the buck-boost current converter 113 or the load 123 is mounted on the supply system to operate.

A constant current being supplied from the constant current source 101 flows into the input ports of the buck-boost current converter 113 connected in series with the over-current breaker F4 through the over-current breaker F1 and the supply switches S11, S12 and S14.

The over-voltage breaker Z4 and the supply switch S13 are connected in parallel between the input ports of the buck-boost current converter 113 and the over-current breaker F4.

The buck-boost current converter 113 is connected in parallel with the input ports of the load 123. The state signal output-port of the load 123 is connected to the load state signal input-port of the buck-boost current converting controller 133.

In the case that the load 123 is not mounted, the load state signal input-port of the buck-boost current converting controller 133 has to generate "NULL" signal autonomously. The buck-boost current converter switching signal of the buck-boost current converting controller 133 is connected to a switching control signal input-port of the buck-boost current converter 113.

A circuit constituted by the load 123 consuming the quantity of currents smaller or greater than the quantity of output currents of the constant current source, the buck-boost current converter 113 that transforms a power supply feeding line constant current to a load 123 current, the buck-boost current converting controller 133 controlling the buck-boost current converter 113, the over-current breaker F4 and the over-voltage breaker Z4 protecting the power supply feeding line and the supply switch S13 connecting or cutting off a power flow to the load 123, and interactions there between are described above.

A constant current load 124 always consumes a quantity of currents equal to the specified quantity of currents which the constant current source 101 outputs.

In the case that the quantity of currents being consumed in the constant current load 124 exceeds a specification, an over-current breaker F5 is broken.

In the case that an overvoltage is applied to an input port of the constant current load 124, an over-voltage breaker Z5 is conducted.

The supply switch S14 is closed when the over-current breaker F5 is broken, an operation current of the constant current load 124 is smaller than specification or the constant current load 124 is not mounted on the supply system. The supply switch S14 is open when the constant current load 124 is mounted on the supply system to operate.

A constant current being supplied from the constant current source 101 flows into the input ports of the constant current load 124 connected in series with the over current breaker F5 through the over-current breaker F1 and the supply switches S11, S12 and S13.

The over-voltage breaker Z5 and the supply switch S14 are connected in parallel between the input ports of the constant current load 124 and the over-current breaker F5.

One output terminal of the over-voltage breaker Z5 and the supply switch S14 is connected to the constant current source 101 to complete a power supply feeding line loop. A circuit constituted by the load 124 consuming the quantity of currents equal to the quantity of output currents being output from the constant current power source, the over-current breaker F5 and the over-voltage breaker Z5 protecting the power supply feeding line and the supply switch S14 connecting or cutting off a power flow to the constant current load 124, and interactions there between are described above.

A load which is constituted by the load 121, the buck current converter 111 and the buck current converting controller 131 and consumes the quantity of currents smaller than the supply current is called "a buck load".

A load which is constituted by the load 122, the boost current converter 112 and the boost current converting controller 132 and consumes the quantity of currents greater than the supply current is called "a boost load".

A load which is constituted by the load 123, the buck-boost current converter 113 and the buck-boost current converting controller 133 and consumes the quantity of currents smaller or greater than the supply current is called "a buck-boost load".

The load 124 consuming the quantity of currents equal to the supply current is called "a constant current load".

The serial loading, constant current source, direct current power supply system of the inventive concept may has multiple constant current loads, multiple buck-boost loads, multiple boost loads and multiple buck loads that are connected in series with a constant current source. Whatever load is applied, the quantities of currents flowing through the power supply feeding line are always fixed. So the power supply has small distribution loss and does not have electromagnetic interference radiation caused by the power supply feeding line.

[Supply Switch]

The supply switches S11~S14 may be a mechanical switch which is open or closed by a mechanical force, a magnetic switch which is open or closed by an electromagnetic force, or an electronic switch which is open or closed by an electronic signal and are connected in parallel with one another.

Mechanical switch constituting the supply switches S11~S14 is automatically open by a physical force being generated when the loads 121~124, the current converters 111~113 or the current converting controllers 131~133 are physically installed on the power supply feeding line and are closed when they are detached from the power supply feeding line. The mechanical switch can be manually open or closed by a control of a user.

A magnetic switch and an electronic switch constituting the supply switches S11~S14 are closed when a signal P23 being output from the current converting controllers 131~133 is active and are open when a signal P23 being output from the current converting controllers 131~133 is inactive.

The supply switches S11~S14 are open when the loads 121~124, the current converters 111~113 or the current converting controllers 131~133 are installed on the power supply feeding line to normally operate and a signal P23 being output from the current converting controllers 131~133 is inactive ("zero"). Except that case described above, the supply switches S11~S14 are always closed except that they are manually open by a control of a user.

[Current Converting Controller]

Figure 2:
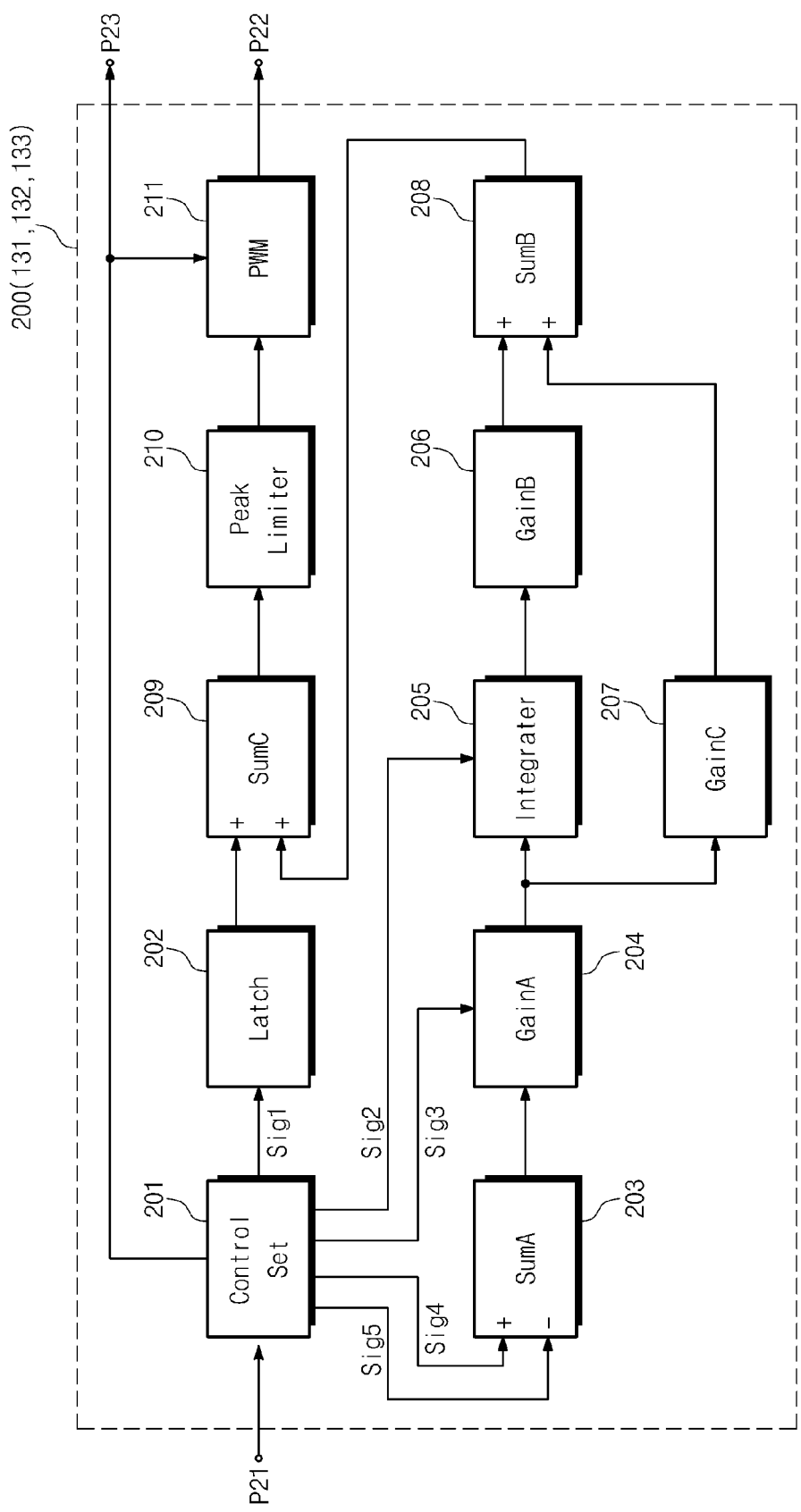
FIG. 2 is a drawing illustrating a current converting controller in accordance with the inventive concept.

FIG. 2 is a drawing illustrating a current converting controller in accordance with the inventive concept.

Figure 3A:
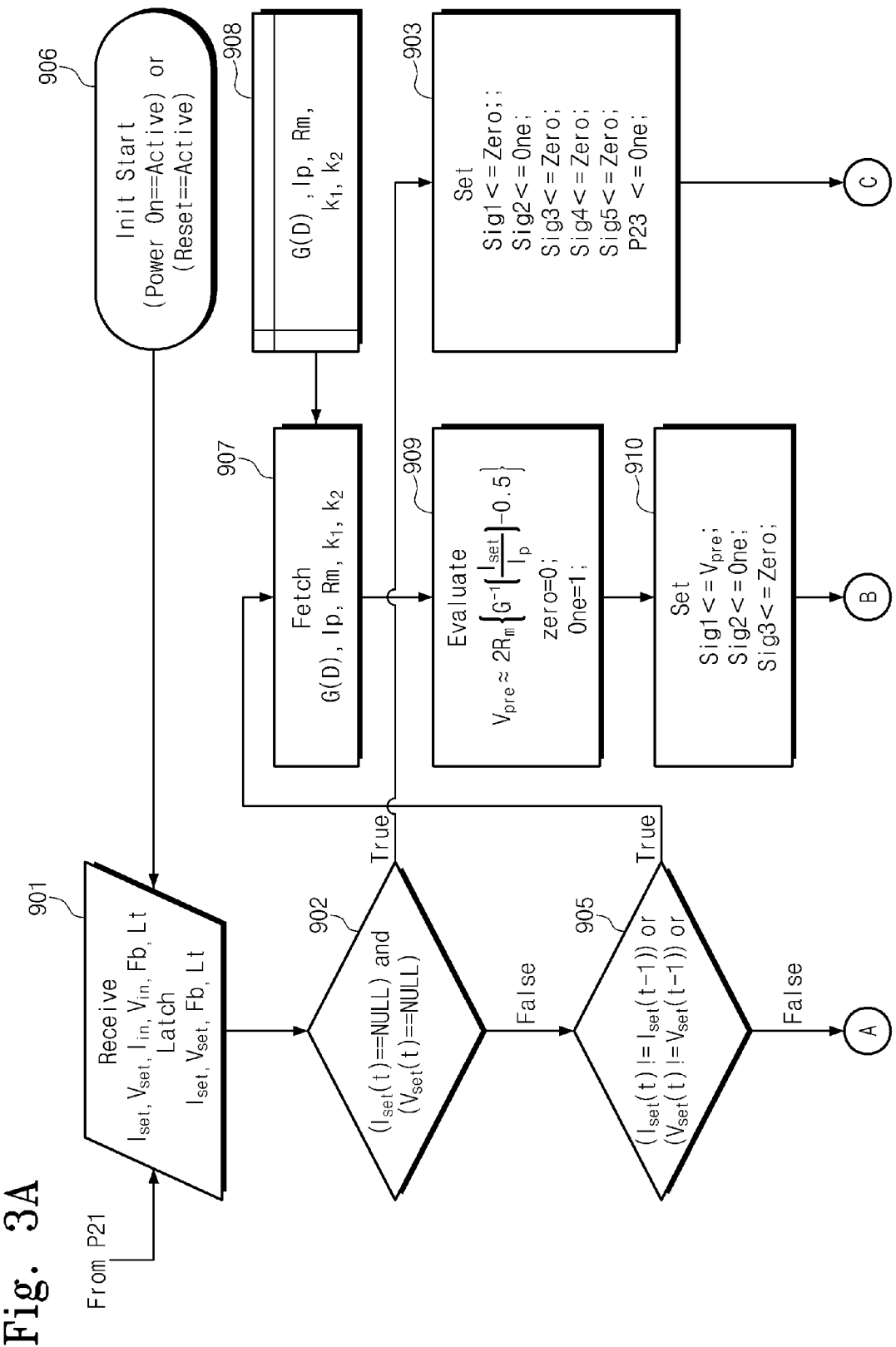
FIGS. 3A and 3B are drawings a control variable setting and a signal connection operation algorithm of a current converting controller in accordance with the inventive concept.
Figure 3B:
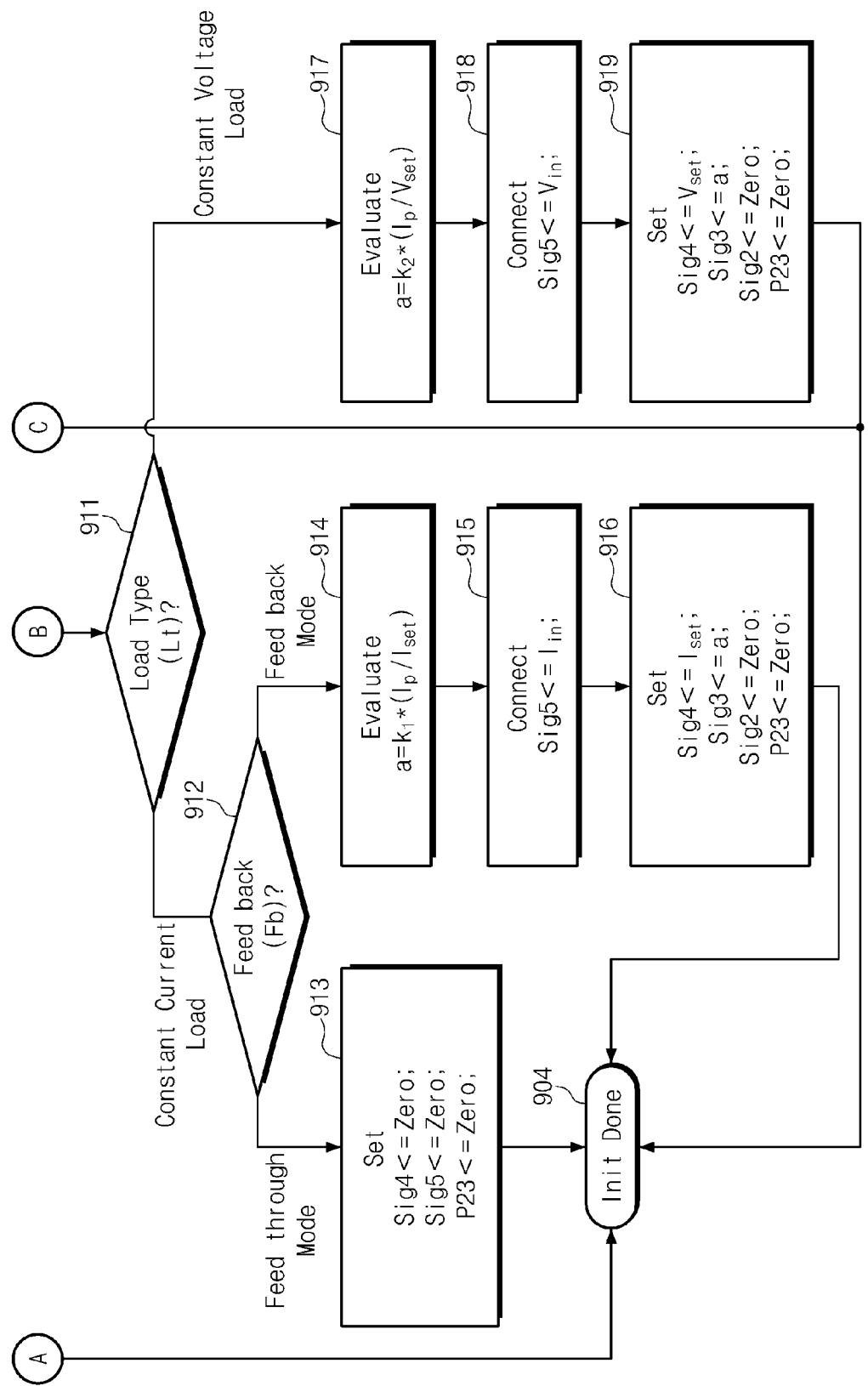

FIGS. 3A and 3B are drawings a control variable setting and a signal connection operation algorithm of a current converting controller in accordance with the inventive concept.

Referring to FIGS. 2, 3A and 3B, a current converting controller 200 is basically a proportional integral controller and is a circuit schematic view of the current converting controllers 131, 132 and 133 illustrated in FIG. 1.

A control set 201 receives current converter control information ($I_{in}$, $V_{in}$) from the loads 121~123 to connect the current converter control information ($I_{in}$, $V_{in}$) to a summer 203 which is an internal block of the current converting controller 200 by way of a signal line sig5 and processes operational information ($I_{set}$, $V_{set}$, $F_b$, $L_t$) being supplied from the loads 121~123 according to an algorithm which will be described later to generate current converting controller operation variables ($V_{pre}$, a variable gain amplifier gain setting signal Sig3, an integrator initializing signal Sig2, PWM modulator output inactivation and a supply switch short signal) that are supplied to a latch 202, a variable gain amplifier 204, an integrator 205 and a switching control signal generator 211 respectively.

In the case that an information input-port P21 from the loads 121~123 is not connected to the control set 201 or a function of the loads 121~123 is stop due to a trouble, the information input-port has to be able to generate "NULL" information autonomously. Furthermore, the control set 201 has to generate and manage "power on" information indicating a power-on initializing state of a current converting controller. The control set 201 also has to detect and manage a "reset" information which is a current converting controller operation initializing signal from an external source and can recognize and store a rated current "$I_p$" of the constant current source 101 flowing through the power supply feeding line, "G(D)" which is an output/input current transfer characteristic of the current converters 111~113 having a variable "D" which is a duty ratio of switching signals being inputted in terminals P33~P83 of the current converters 111~113, a duty ratio output transfer characteristic "D(v)" relative to an input of a pulse-width modulation (PWM) 211, an amplitude "$R_m$" of a bipolar sawtooth-shaped signal which is an internal reference signal of the pulse-width modulation (PWM) 211, and "$k_1$" and "$k_2$" which are current converting controller operational variables optimally designed in advance according to an algorithm which will be described later. Herein, the "v" is a signal which is output from a peak limiter 210 and input to the pulse-width modulation 211

There are a current ($I_m$) flowing through an load resistor and a voltage ($V_{in}$) being applied to the load resistor as control information that can be transmitted from the loads 121~123 to the control set 201. Effective power being consumed inside the loads 121~123 in real time can be calculated by a following formula $I_{in} * V_{in}$.

There may be a current ($I_{set}$) that wants to flow through a resistor in the loads 121~123 and a voltage ($V_{set}$) that wants to be applied to a resistor in the loads 121~123 as operational information that can be received to the control set 201.

There may be a load type ($L_t$) representing electrical property of a load and $F_b$ indicating whether a current converter feedback control loop is closed or open as operational information that can be received to the control set 201. The $L_t$ can indicate a constant current type or a constant voltage type and the $F_b$ can indicate a feed-through mode or a feed-back mode.

The latch 202 stores a signal Sig1 being provided from the control set 201. A signal which is stored in the latch 202 to be input to a summer 209 designates an output initial value of the pulse-width modulation (PWM) 211.

A summer 203 generates a control error value. Signals Sig4 and Sig5 being provided from the control set 201 include a current $I_{set}$ which is operational information and a current $I_{in}$ which is control voltage respectively, or a voltage $V_{set}$ which is operational information and a voltage $V_{in}$ which is control voltage respectively depending on an operational mode. The signals Sig4 and Sig5 are input to the summer 203. The summer 203 generates an error signal of $I_{set}-I_{in}$ or $V_{set}-V_{in}$ to apply the generated error signal to the variable gain amplifier 204.

The variable gain amplifier 204 amplifies an error signal generated from the summer 203 by a gain indicated by a gain control signal Sig3 being applied from the control set 201 to supply the amplified error signal to the integrator 205 and a fixed gain amplifier 207. The amplified error signal is integrated through the integrator 205 and then is supplied to a fixed gain amplifier 206. The error signal supplied to the fixed gain amplifier 206 is amplified once more and then is supplied to one input port of a summer 208.

In the case that the signal Sig2 which is a processing result of the operational information being supplied from the load is active ("ONE"), the output of the integrator 205 has value "0".

The summer 208 adds up an output of the amplifier 207 and an output of the amplifier 206 to supply the added outputs to the summer 209. The summer 209 adds up an output of the latch 202 and an output of the summer 208 to supply the added outputs to the peak limiter 210.

The peak limiter 210 limits an input signal of the pulse width modulation 211 within an absolute value of amplitude ($R_m$) of a pulse width modulation reference signal. The signal outputted by the peak limiter 210 is input to the pulse width modulation 211 to generate a switching signal. The generated switching signal having a duty ratio of "D(v)" is input to the switching signal input ports P33~P83 of the current converters 111~113 to be used as a control variable of an output/input current transfer characteristic "G(D)" of the current converters 111~113. Connection configuration, signal interaction and information which has to be received, detected or recognized of the current converting controller 200 are described.

To secure a rapid response characteristic of the current converting controller 200, a control procedure of the current converting controller will be optimized for feed-back or feed-through control modes.

A gain of the variable gain amplifier 204 is referred to as "a", a gain of the fixed gain amplifier 206 is referred to as "b", a signal which is calculated by the control set 201 and stored in the latch 202 at the beginning of an operation of the controller to affect an operation initial value of the pulse width modulation 211 is referred to as "$V_{pre}$" and the maximum amplitude of a bipolar sawtooth-shaped reference signal of the inside of the pulse width modulation 211 "$V_{pre}$" is referred to as "$R_m$".

If an output control target is a current $I_{in}(t)$, a characteristic of a feed-back system constituted by a current converter and a current converting controller is determined by mathematical formulas 1 and 2.

$$I_{in}(t) = I_p G(D(t)) \quad \text{[mathematical formula 1]}$$

$$D(t) = \frac{\int_0^t ab(I_{set} - I_{in}(t))\,dt + ac(I_{set} - I_{in}(t)) + V_{pre}}{2R_m} + 0.5 \quad \text{[mathematical formula 2]}$$

Since a wanted control target is that a control reference current $I_{set}$ becomes same as an output current $I_{in}$ after time $t_{conv}$ passes, a mathematical formula 3 is established.

$$I_{in}(t_{conv}) = I_p G(D(t_{conv})) = I_{set} \quad \text{[mathematical formula 3]}$$

When a current setting command signal $I_{set}$ is loaded on the controller, a duty ratio after a time $I_{conv}$ can be represented by a mathematical formula 4.

$$D(t_{conv}) = \frac{\int_0^{t_{conv}} ab(I_{set} - I_{in}(t))\,dt + V_{pre}}{2R_m} + 0.5 \quad \text{[mathematical formula 4]}$$

Accordingly, a mathematical formula 5 is established.

$$V_{pre} = 2R_m\left\{G^{-1}\left(\frac{I_{set}}{I_p}\right) - 0.5\right\} - \int_0^{t_{conv}} ab(I_{set} - I_{in}(t))\,dt \quad \text{[mathematical formula 5]}$$

Since $t_{conv}$ has to be very small, a second integral term of the mathematical formula 5 is close to "0". Thus, a mathematical formula 6 is established.

$$V_{pre}|_{optimum} \approx 2R_m\left\{G^{-1}\left(\frac{I_{set}}{I_p}\right) - 0.5\right\} \quad \text{[mathematical formula 6]}$$

The mathematical formula 6 is irrelevant to a control variable "a" completing a current converter feed-back loop. Thus, when a new command signal $I_{set}$ is applied regardless of opening and closing of a feed-back loop, if the initial command signal "$V_{pre}$" is used as an input value of the pulse width modulation 211, the new command signal $I_{set}$ can make a rapid initial response. That is, the mathematical formula 6 can be used as system initial control information regardless of opening and closing of a feed-back loop.

To minimize the error term $\int_0^{t_{conv}} ab(I_{set} - I_{in}(t))\,dt$ of $V_{pre}$ at time "0", that is, after a new command signal is inputted at the control set 201, the integrator 205 must be initialized.

In the case of a constant current load operation, a system transient (small-signal) response characteristic after the initialization will be optimized.

A Laplace transform of a small signal response controlling a perturbation characteristic of the system may be represented by a mathematical formula 7.

$$i_{in}(s) = \frac{\frac{1}{2R_m}g(s)a\left(\frac{b}{s}+c\right)}{1+\frac{1}{2R_m}g(s)a\left(\frac{b}{s}+c\right)}i_{set}(s) \quad \text{[mathematical formula 7]}$$

Herein, $g(s)$, $i_{in}(s)$, $i_{set}(s)$ are small signal response Laplace transforms of a transfer characteristic $G(D(t))$ of the current converters 111~113, a current $I_{in}(t)$ which is output from the current converters 111~113 to be inputted to a load and then is sensed at a resistance of the load, and $I_{set}(t)$ being used as a reference signal of a current converting controller being applied through the signal Sig4 respectively.

Generally, $g(s)$ is a nonlinear function of a large signal $I_p$ and $D(t)$, that is, $I_p$ and $I_{set}$.

To obtain an optimum transient response characteristic of the system after $t_{conv}$ let normalizes the $g(s)$ with a zero frequency gain $G(D(t_{conv}))$ then we can obtain $h(s)$ in a mathematical formula 8.

$$g(s) \approx G(D(t_{conv}))h(s) \quad \text{[mathematical formula 8]}$$

Thus, the system small signal response characteristic is transformed to a mathematical formula 9.

$$i_{in}(s) = \frac{\frac{1}{2R_m}G(D(t_{conv}))ah(s)\left(\frac{b}{s}+c\right)}{1+\frac{1}{2R_m}G(D(t_{conv}))ah(s)\left(\frac{b}{s}+c\right)}i_{set}(s) \quad \text{[mathematical formula 9]}$$

It is assumed that a gain "a" of the variable gain amplifier 204 has a relation like a mathematical formula 10.

$$G(D(t_{conv}))a = k_1 \quad \text{[mathematical formula 10]}$$

Here, $k_1$ is information which has to be determined when an optimum design of a system is performed and then to be stored in a current converting controller and is a constant of a specific value to be used as an operation information of the current converting controller.

A mathematical formula 11 is a transient response characteristic which has to be optimized when a system is designed. The mathematical formula 11 has a linear response characteristic irrelevant to amplitude of a control target signal, that is, $I_p$ and $I_{set}$. The mathematical formula 11 is represented as below.

$$i_{in}(s) = \frac{\frac{k_1}{2R_m}h(s)\left(\frac{b}{s}+c\right)}{1+\frac{k_1}{2R_m}h(s)\left(\frac{b}{s}+c\right)}i_{set}(s) \qquad \text{[mathematical formula 11]}$$

Thus, if a response characteristic of the current converting controller is optimized according to the mathematical formula 11 in advance when designing the system to determine design optimization variables $k_1$, b and c, the gain a of the variable gain amplifier 204 being determined by a mathematical formula 12 below has to be generated when a reference current $I_{set}$ which is a driving command is newly applied to be used to control a loop.

$$a = k_1 \frac{I_p}{I_{set}} \qquad \text{[mathematical formula 12]}$$

In this case, the current converter has always an optimum response.

In the case that a constant voltage load is feed-back controlled, a control procedure of the current converting controller will be optimized.

In the case of the constant voltage load, an output control target is a voltage $V_{in}(t)$ and a characteristic of a feed-back system constituted by the current converter and the current converting controller is determined by mathematical formulas 13 and 14 below. Here, $R_L$ is an effective resistance of a place where $V_{in}(t)$ is measured in the loads 121~123.

$$V_{in}(t)=R_L(t)I_p G(D(t)) \qquad \text{[mathematical formula 13]}$$

$$\int_0^t ab(V_{set}-V_{in}(t))dt + \qquad \text{[mathematical formula 14]}$$
$$D(t)\frac{ac(V_{set}-V_{in}(t))+V_{pre}}{2R_m}+0.5$$

A mathematical formula 15 is established by the same logic as the case of the constant current load.

$$D(t_{conv}) = \frac{V_{pre}}{2R_m}+0.5 \qquad \text{[mathematical formula 15]}$$

In a system balance state after time $t_{conv}$, a mathematical formula 16 is established.

$$V_{in}(t_{conv})=R_L I_p G(D(t_{conv}))=V_{set} \qquad \text{[mathematical formula 16]}$$

Thus, an initial latch value of a constant voltage operation mode has to satisfy a mathematical formula 17 below.

$$V_{pre}|_{optimum} \approx 2R_m\left\{G^{-1}\left(\frac{V_{set}}{R_L I_p}\right)-0.5\right\} \qquad \text{[mathematical formula 17]}$$

Since a voltage command value and a current command value have to be set so that $V_{set}=R_L * I_{set}$, an initial setting value of the latch 202 of a constant voltage operation mode is determined by a mathematical formula 18.

$$V_{pre} = 2R_m\left\{G^{-1}\left(\frac{I_{set}}{I_p}\right)-0.5\right\} \qquad \text{[mathematical formula 18]}$$

Thus, the latch 202 setting value is same in the constant voltage operation mode and the constant current operation mode.

To minimize the error term $\int_0^{t_{conv}}ab(V_{set}-V_{in}(t))dt$ of $V_{pre}$ at time "0", that is, after a new command signal is inputted at the control set 201, the integrator 205 must be initialized.

In the case of a constant voltage load operation, a system transient (small-signal) response characteristic after the initialization will be optimized.

A Laplace transform of a small signal response controlling a perturbation characteristic of the system may be represented by a mathematical formula 19.

$$v_{in}(s) = \frac{\frac{R_L}{2R_m}g(s)a\left(\frac{b}{s}+c\right)}{1+\frac{R_L}{2R_m}g(s)a\left(\frac{b}{s}+c\right)}v_{set}(s) \qquad \text{[mathematical formula 19]}$$

Herein, $v_{in}(s)$ and $v_{set}(s)$ are small signal response Laplace transforms of a voltage $V_{in}(t)$ which is output from the current converters 111~113 to be inputted to a load and then is sensed at an effective load resistance, and $V_{set}(t)$ being used as a reference signal of a current converting controller being applied through the signal Sig4 respectively.

If converting the mathematical formula 19 using $g(s)\approx G(D(t_{conv}))h(s)$, a mathematical formula 20 is obtained.

$$v_{in}(s) = \frac{\frac{R_L}{2R_m}G(D(t_{conv}))h(s)a\left(\frac{b}{s}+c\right)}{1+\frac{R_L}{2R_m}G(D(t_{conv}))h(s)a\left(\frac{b}{s}+c\right)}v_{set}(s) \qquad \text{[mathematical formula 20]}$$

It is assumed that $R_L G(D(t_{conv}))a=k_2$.
Here, $k_2$ is a fixed constant.
The system which is optimized by a designer is represented by a mathematical formula 21 below and is a linear function irrelevant to amplitudes of $I_p$ and $V_{set}$.

$$v_{in}(s) = \frac{\frac{k_2}{2R_m}h(s)\left(\frac{b}{s}+c\right)}{1+\frac{k_2}{2R_m}h(s)\left(\frac{b}{s}+c\right)}v_{set}(s) \qquad \text{[mathematical formula 21]}$$

Thus, in $R_L G(D(t_{conv}))a=k_2$, a control variable a is obtained by a mathematical formula 22 below.

$$a = k_2 \frac{1}{R_L G(D(t_{conv}))} = k_2 \frac{I_p}{V_{set}} \qquad \text{[mathematical formula 22]}$$

In this case, the current converter has always an optimum response characteristic which has been optimized by a designer.

An optimum control method of the current converter is described above. Consequently, control variables can be obtained using $G(I_p, I_{set})$ which is a large signal transfer characteristic of the current converter, a modulator reference signal amplitude $R_m$, a power supply feeding line current $I_p$ and information about $I_{set}$ and $V_{set}$ which are current or voltage demand being inputted from a load. If the system is optimized in advance, the current converter can be set in an optimum control state and if there is one information of a real time measuring current and a real time measuring voltage $V_{in}$ that are inputted from a load, a current load or a voltage load can be optimally controlled.

[Current Converter Control Circuit Control/Driving Algorithm]

Referring to FIGS. 2 and 3, an algorithm stage (step 906) is an initializing step. If a new event (a "power on" signal is in an active state) occurs in a "power on" signal which is an internal signal which means a state that a sufficient driving power is newly applied to the current converting controller, or a new event (a "reset" signal is in an active state) occurs in a "reset" signal which is an internal initializing signal of the current converting controller, the step 906 procedures enter. After entering the step 906, the procedure proceeds to a step 901.

If the step 906 is performed or a new event occurs from a terminal P21, the step 901 procedures enter. The algorithm stage (step 901) receives $I_{set}$, $V_{set}$, $F_b$, and $L_t$ which are load information being inputted from a load and latches (store) them in the inside thereof. The algorithm stage (step 901) receives all or any one of $I_{in}$ and $V_{in}$ which are load control information. After that, the procedure proceeds to a step 902.

If the step 901 is performed, the step 902 procedures enter. The algorithm (step 902) checks $I_{set}$ or $V_{set}$ information to check whether a load is detached state or whether to have a "NULL" value meaning a stop of power feeding to the load. If a check result is "true", the procedure proceeds to a step 903 and if a check result is "false", the procedure proceeds to a step 905.

If the step 902 is performed, so that $I_{set}$ and $V_{set}$ information values are a "NULL" state, the step 903 procedures enter. The control set 201 sets the control signals Sig1, Sig3, Sig4 and Sig5 to "0" to output them and sets the control signal Sig2 and the terminal output signal P23 to "1" to output them on the basis of that described above. This means that if an input initial value of the pulse-width modulation 211 is "0", a gain of a variable gain amplifier is "0", a control reference (command) signal is "0", a control feed-back signal is "0" and the signal Sig2 is "1", the integrator 205 is initialized and thereby its output becomes "0". If the terminal output signal P23 is "1", an output of the pulse-width modulation 211 is set so that a switching device in the current converter is in a "NULL" state, that is, in the case that the switching device is connected in parallel with an input port, the switching device is closed and in the case that the switching device is connected in series with an input port, the switching device is open. After that, the procedure proceeds to a step 904.

When steps 903, 919, 916 and 913 are completed or a judgment result in the step 905 is "false", the step 904 procedures enter. All the controller's output signals and internal variables maintain their previous states and all input signals are continuously inputted from a load in the algorithm step 904. In the case that the setting of the current converting controller is completed, the step 904 maintains the current state until the current converting controller is reset.

In the case that the result of the step 902 is "false", the step 905 procedures enter. The step 905 checks whether "$I_{set}(t)$" which is currently received and "$I_{set}(t-1)$" which is received and latched previously are different from each other. The step 905 also checks whether "$V_{set}(t)$" which is currently received and "$V_{set}(t-1)$" which is received and latched previously are different from each other. If at least one of the check results is "true", the result of the step 905 becomes "true". If not, the result of the step 905 becomes "false". If a result of the step 905 is "true", the procedure proceeds to a step 907 and if a result of the step 905 is "false", the procedure proceeds to the step 904.

If a result of the step 905 is "true", the step 907 procedures enter. The step 907 fetches G(D), $I_p$, $R_m$, $k_1$, and $k_2$ from a storage of the controller. The G(D) is a current converter transfer characteristic, the $I_p$ is a constant current source output current, the $R_m$ is an internal bipolar sawtooth waveform's amplitude in PWM modulator and the $k_1$ and $k_2$ are current converting controller design optimization variables that are stored in a step 908 which is an internal information storage of a current converting controller. After that, the procedure proceeds to a step 909.

The step 908 is a storage place storing the optimum operating information of the current converting controller. Whenever the step 907 is performed, the step 908 provides G(D), $R_m$, $I_p$, $k_1$, and $k_2$ information to the step 907.

After the step 907 is performed, the step 909 procedures enter. The step 909 initializes "zero" and "one" which are needed to set an output signal and calculates "$V_{pre}$" which is a modulator initial value variable in a current converting controller. The "$V_{pre}$" is represented by a calculation formula below.

$$V_{pre} \approx 2R_m \left\{ G^{-1}\left(\frac{I_{set}}{I_p}\right) - 0.5 \right\}$$

Herein, $G^{-1}(\ )$ is an inverse function of G(D), $I_p$ is a constant current source output current, $I_{set}$ is a load current setting command being inputted form a load and $R_m$ is a modulator internal bipolar sawtooth-waveform's amplitude. After that, the procedure proceeds to a step 910.

After the step 909 is performed, the step 910 procedures enter. The step 910 applies "$V_{pre}$" which is an initial setting value of the PWM modulator input calculated in the step 909, output the Sig2 in a state "one" to initialize an output of the integrator to "0" and makes the signal Sig3 to "zero" to make the gain of the amplifier "0". After that, the procedure proceeds to a step 911.

After the step 910 is performed, the step 911 procedures enter. If a value of "$L_t$" which is a load type indicator and latched from a load is judged to be "constant current load", the procedure goes to a step 912 and if a value of "$L_t$" is judged to be "constant voltage load", the procedure enters to a step 917.

If the step 911 is judged to be "constant current load", the step 912 procedures enter. If a value of "$F_b$" which is a feed-back control type indicator and latched from a load is judged to be "feed through mode", the procedure goes to a step 913 and if a value of "$F_b$" is judged to be "feed-back mode", the procedure goes to a step 914.

If the step 912 is "feed through mode", the step 913 procedures enter. The step 913 initializes an internal state of a current converting controller so that the current converting controller is suited for a feed through operation that does not need a feed-back loop control. That is, the step 913 sets the signal Sig4 which is an error detector reference input to a "zero" state and the signal Sig5 which is a control input to a "zero" state. The step 913 starts a converter operation and sets the signal P23 which opens a supply switch to a "zero". In the step 913, a control of an open feed-back loop for a constant current load is completed. After that, the procedure proceeds to a step 904.

If the step 912 is a "feed-back mode", the step 914 procedures enter. The step 914 can calculate "a" which is a gain control variable of the variable gain amplifier 204 for performing a close loop control for a constant current load by the following equation.

$$a = k_1 \frac{I_p}{I_{set}}$$

Herein, $I_p$ is a constant current source output current, $I_{set}$ is a load current setting command being inputted from a load and $k_1$ is a design optimization variable of a current converting controller. They are determined and stored in advance. After that, the procedure proceeds to a step 915.

After the step 914 is performed, the step 915 procedures enter. The step 915 performs an operation of connecting a control signal "$I_{in}$" being measured and inputted from a load to a control signal input terminal "−" of the summer 203 which is an error signal generator. After that, the procedure proceeds to the step 916.

After the step 915 is performed, the step 916 procedures enter. The step 916 applies "$I_{set}$" signal inputted from a load to a reference signal input terminal "+" of the summer 203 which is an error signal generator. The step 916 applies "a" calculated in the step 913 in advance to the signal Sig3 determining an operational gain of the variable gain amplifier 204. The step 916 applies the signal Sig2 of "zero" so that an integrator initialization signal becomes an inactive state and sets the signal P23 which opens a supply switch to "zero". In the step 916, a control of a feed-back loop for a constant current load is completed. After that, the procedure proceeds to the step 904.

If the step 911 is "constant voltage load", the step 917 procedures enter. The step 917 can calculate "a" which is a gain control variable of the variable gain amplifier 204 for performing a close loop control for a constant voltage load by a function below.

$$a = k_2 \frac{I_p}{V_{set}}$$

Herein, $I_p$ is a constant current source output, $V_{set}$ is a load voltage setting command being inputted from a load and $k_2$ is a design optimization variable of a current converting controller. They are determined and stored in advance. After that, the procedure proceeds to a step 918.

After the step 917 is performed, the step 918 procedures enter. The step 918 performs an operation of connecting a control signal "$V_{in}$" being measured and inputted from a load to a control signal input terminal "−" of the summer 203 which is an error signal generator. After that, the procedure proceeds to the step 919.

After the step 918 is performed, the procedure enters the algorithm step 919. The step 919 applies "$V_{set}$" signal inputted from a load to a reference signal input terminal "+" of the summer 203 which is an error signal generator. The step 919 applies "a" calculated in the step 917 in advance to the signal Sig3 determining an operational gain of the variable gain amplifier 204. The step 919 applies the signal Sig2 of "zero" so that an integrator initialization signal becomes an inactive state and sets the signal P23 which opens a supply switch to "zero". In the step 919, a control of a feed-back loop for a constant voltage load is completed. After that, the procedure proceeds to the step 904.

[Buck Current Converter Circuit]

Figure 4:
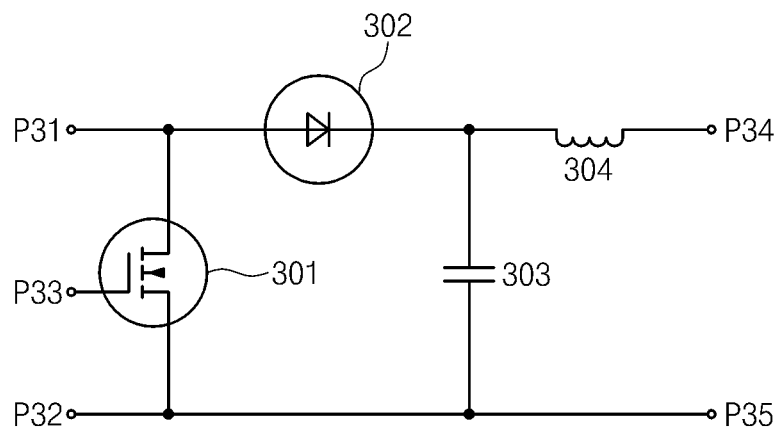
FIG. 4 is a drawing illustrating a buck current converting circuit in accordance with the inventive concept.

FIG. 4 is a drawing illustrating a buck current converting circuit in accordance with the inventive concept.

The buck current converter is constituted by a switch 301 connected in parallel with input current terminals P31 and P32, a diode 302 connected in series with the switch 301, a capacitor 303 connected in parallel with the diode 302, an inductor 304 connected in series with the capacitor 303 and output current terminals P34 and P35 being output from the inductor 304. A switching control signal of the buck current converter is the input signal of the terminal P33 of the switch 301 through the current converting controller output terminal P22.

In the buck current converter, if in a continuous voltage mode (CVM) which is a state in which a voltage of the capacitor 303 is always not "0" at any time of an operation period, a current being input to the input current terminal P31 is called "$I_p$" and a current being output from the output current terminal P34 is called "$I_{in}$", a relation between the "$I_p$" and "$I_{in}$" can be represented by a mathematical formula 23 below. Herein, "D" means a duty ratio of an output signal of the pulse-width modulator 211 and D' is (1−D).

$$I_{in} = (1-D)I_p = D'I_p \qquad \text{[mathematical formula 23]}$$

In a discontinuous voltage mode (DVM) which is a state in which a voltage of the capacitor 303 is "0" at a certain time of an operation period, a relation between the "$I_p$" and "$I_{in}$" can be represented by a mathematical formula 24 below. Herein, "C" is capacitance of the capacitor 303, "fs" is a switching control signal frequency being inputted from the switch terminal P33 and "$R_L$" is a load effective resistor.

$$I_{in} = \frac{(1-D)}{\sqrt{2f_s R_L C} + (1-D)} I_p = \frac{D'}{D' + \sqrt{2f_s R_L C}} I_p \qquad \text{[mathematical formula 24]}$$

[Boost Current Converting Circuit]

Figure 5:
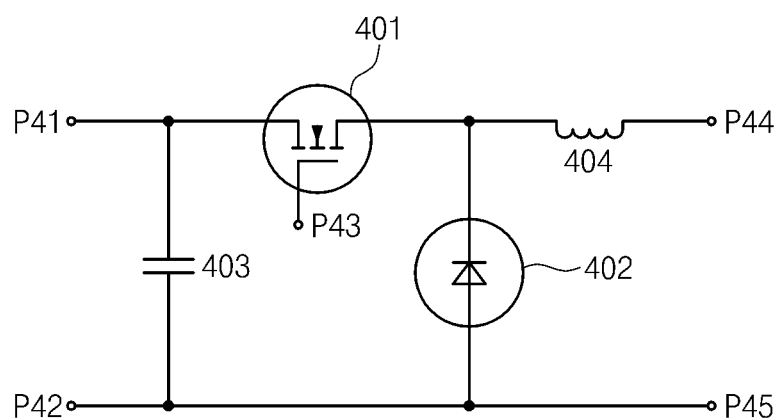
FIG. 5 is a drawing illustrating a boost current converter in accordance with the inventive concept.

FIG. 5 is a drawing illustrating a boost current converter in accordance with the inventive concept.

Referring to FIG. 5, the boost current converter is constituted by a capacitor 403 connected in parallel with input current terminals P41 and P42, a switch 401 connected with the capacitor 403, a diode 402 connected in parallel with the switch 401, an inductor 404 connected in series with the diode 402 and output current terminals P44 and P45 being outputted from the inductor 404. A switching control signal of the boost current converter is input to the terminal P43 of the switch 401 through the current converting controller output terminal P22.

In the boost current converter, if a current being input to the terminal P41 is called "$I_p$" and a current being output from the terminal P44 is called "$I_{in}$", a relation between "$I_p$" and "$I_{in}$" can be represented by a mathematical formula 25. Herein, "D" means a duty ratio of an output signal of the pulse-width modulator 211 and D' is (1−D).

$$I_{in} = \frac{1}{1-D} I_p = \frac{1}{D'} I_p \qquad \text{[mathematical formula 25]}$$

[Buck-boost Current Converting Circuit]

Figure 6:
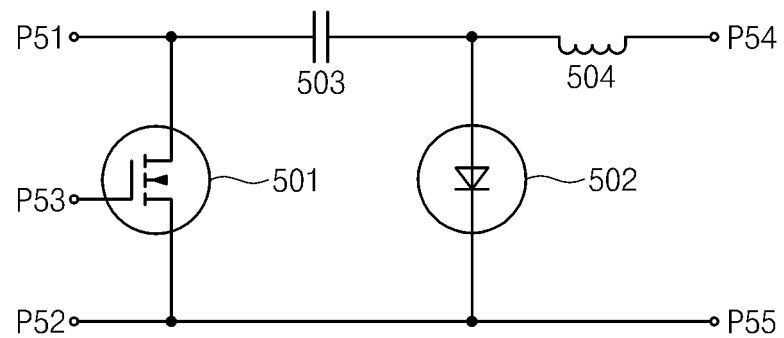
FIG. 6 is a drawing illustrating a buck-boost current converter in accordance with the inventive concept.

FIG. 6 is a drawing illustrating a buck-boost current converter in accordance with the inventive concept.

Referring to FIG. 6, the buck-boost current converter is constituted by a switch 501 connected in parallel with input current terminals P51 and P52, a capacitor 503 connected in series with the switch 501, a diode 502 connected in parallel with the capacitor 503, an inductor 504 connected in series with the diode 502 and output current terminals P54 and P55 being outputted from the inductor 504. A switching control signal of the buck-boost current converter is input to the terminal P53 of the switch 501 through the current converting controller output terminal P22.

In the buck-boost current converter, if in a continuous voltage mode (CVM) which is a state in which a voltage of the capacitor 503 is always not "0" at any time of an operation period, a current being input to the input current terminal P51 is called "$I_p$" and a current being output from the output current terminal P54 is called "$I_{in}$", a relation between the "$I_p$" and "$I_{in}$" can be represented by a mathematical formula 26 below. Herein, "D" means a duty ratio of an output signal of the pulse-width modulator 211 and D' is (1−D).

$$I_{in} = \frac{D-1}{D}I_p = \frac{-D'}{1-D'}I_p \qquad \text{[mathematical formula 26]}$$

In a discontinuous voltage mode (DVM) which is a state in which a voltage of the capacitor 503 is "0" at a certain time of an operation period, a relation between the "$I_p$" and "$I_{in}$" can be represented by a mathematical formula 27 below. Herein, "C" is capacitance of the capacitor 503, "$f_s$" is a switching control signal frequency being input the switch terminal P53 and "$R_L$" is a load effective resistor.

$$I_{in} = \frac{D-1}{\sqrt{2f_s R_L C}}I_p = \frac{-D'}{\sqrt{2f_s R_L C}}I_p \qquad \text{[mathematical formula 27]}$$

[Cook Current Converting Circuit]

Figure 7:
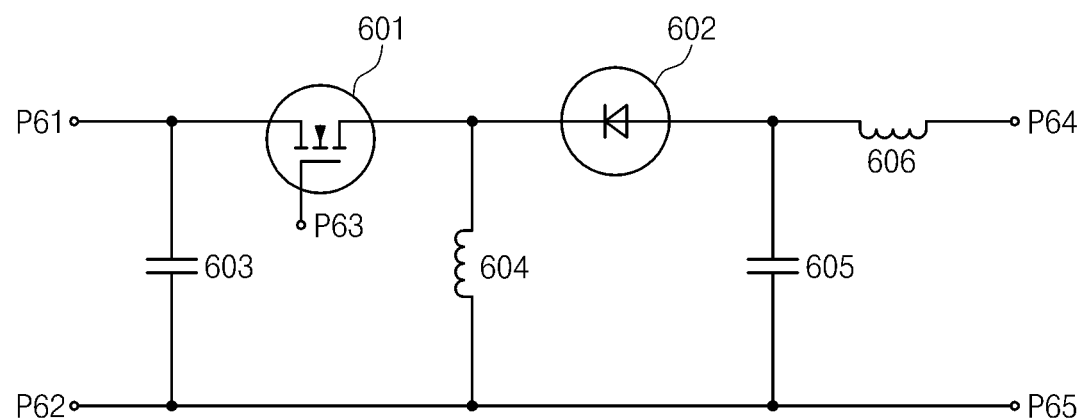
FIG. 7 is a drawing illustrating a cook current converter in accordance with the inventive concept.

FIG. 7 is a drawing illustrating a cook current converter in accordance with the inventive concept.

Referring to FIG. 7, the cook current converter is constituted by a capacitor 603 connected in parallel with input current terminals P61 and P62, a switch 601 connected in series with the capacitor 603, an inductor 604 connected in parallel with the switch 601, a diode 602 connected in series with the inductor 604, a capacitor 605 connected in parallel with the diode 602, an inductor 606 connected in series with the capacitor 605 and output current terminals P64 and P65 being outputted from the inductor 606. A switching control signal of the cook current converter is input to the terminal P63 of the switch 601 through the current converting controller output terminal P22.

In the cook current converter, if in a continuous voltage mode (CVM) which is a state in which voltages of the capacitors 603 and 605 are always not "0" at any time of an operation period, a current being input to the input current terminal P61 is called "$I_p$" and a current being output from the output current terminal P64 is called "$I_{in}$", a relation between the "$I_p$" and "$I_{in}$" can be represented by a mathematical formula 28 below. Herein, "D" means a duty ratio of an output signal of the pulse-width modulator 211 and D' is (1−D).

$$I_{in} = \frac{D-1}{D}I_p = \frac{-D'}{1-D'}I_p \qquad \text{[mathematical formula 28]}$$

Figure 8:
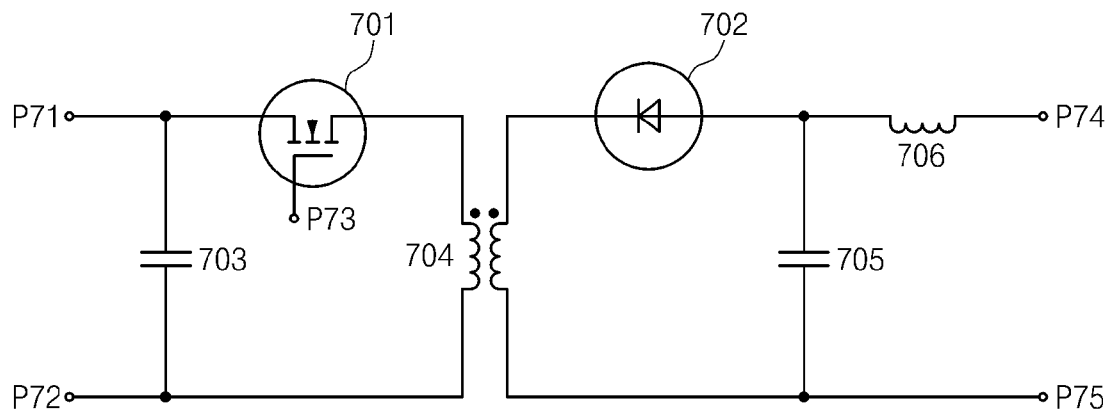
FIG. 8 is a drawing illustrating another type of cook current converter in accordance with the inventive concept.

FIG. 8 is a drawing illustrating another type of cook current converter in accordance with the inventive concept.

Referring to FIG. 7, the inductor 604 of the cook current converter of FIG. 7 can be replaced with a transformer having the same magnetizing inductance as the inductor 604. In the circuit of FIG. 8, the inductor 604 is replaced with a transformer 704. Circuit elements of FIG. 8 except the transformer 704 have the same functions as the circuit elements of FIG. 7. In the case that turns ratio of the transformer 704 is 1:1, the mathematical formula 28 can be applied to a relation between an input current and an output current. The circuit of FIG. 8 is the same with a conventional flyback voltage converting circuit in which a capacitor and an inductor are added to an input port and an output stage respectively.

Essentially, the cook current converter can be classified as a buck-boost current converter.

[Sepic Current Converting Circuit]

Figure 9:
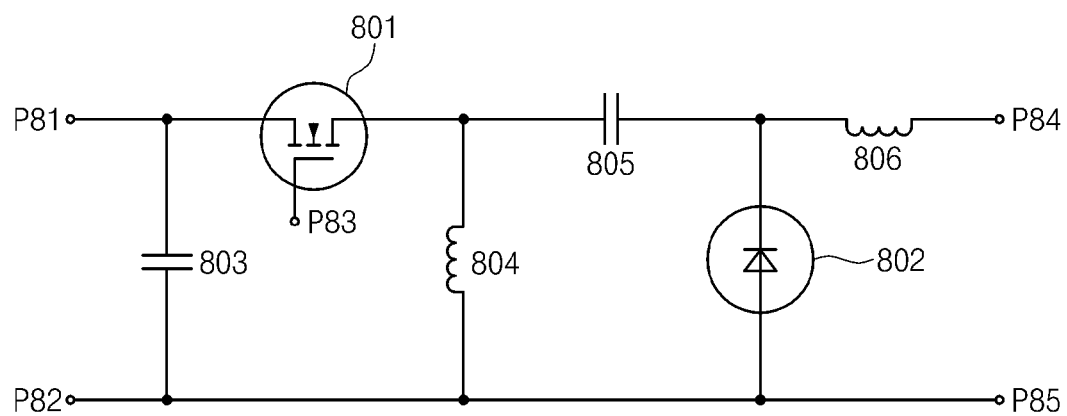
FIG. 9 is a drawing illustrating a sepic current converter in accordance with the inventive concept.

FIG. 9 is a drawing illustrating a sepic current converter in accordance with the inventive concept.

Referring to FIG. 9, the sepic current converter is constituted by a capacitor 803 connected in parallel with input current terminals P81 and P82, a switch 801 connected in series with the capacitor 803, an inductor 804 connected in parallel with the switch 801, a capacitor 805 connected in series with the inductor 804, a diode 802 connected in parallel with the capacitor 805, an inductor 806 connected in series with the diode 802 and output current terminals P84 and P85 being outputted from the inductor 806. A switching control signal of the sepic current converter is input to the terminal P83 of the switch 801 through the current converting controller output terminal P22.

In the sepic current converter, if in a continuous voltage mode (CVM) which is a state in which voltages of the capacitors 803 and 805 are always not "0" at any time of an operation period, a current being input to the input current terminal P81 is called "$I_p$" and a current being output from the output current terminal P84 is called "$I_{in}$", a relation between the "$I_p$" and "$I_{in}$" can be represented by a mathematical formula 29 below. Herein, "D" means a duty ratio of an output signal of the pulse-width modulator 211 and D' is (1−D).

$$I_{in} = \frac{1-D}{D}I_p = \frac{D'}{1-D'}I_p \qquad \text{[mathematical formula 29]}$$

If replacing the inductor 804 of the sepic current converting circuit with a transformer having the same magnetizing inductance as the inductor 804, we can construct one new isolated sepic current converting circuit. Another sepic current converting circuit can be obtained by replacing the capacitor 805 with capacitors having capacitance two times as large as the capacitor 805 connected in series with each other and inserting a transformer into a serial connecting point between the capacitors.

Essentially, the sepic current converter can be classified as a buck-boost current converter.

Structures of the buck-boost current converters of the three cases described above are as follows.

A structure of the sepic current converter of FIG. 9 includes the switch 801, the diode 802, the capacitor 803, the inductor 804, the capacitor 805 and the inductor 806.

The capacitor 803 is connected in parallel with the current input terminals P81 and P82. One end of the switch 801 is connected to the current input terminal P81 and the switch 801 operates in response to a switching signal being inputted through the current control terminal P83. One end of the inductor 804 is connected to the other end of the switch 801 and the other end of the inductor 804 is connected to a contact point between the current input terminal P82 and the capacitor 803. One end of the capacitor 805 is connected to a contact point between the switch 801 and the inductor 804. One end of the inductor 806 is connected to the other end of the capacitor 805 and the other end of the inductor 806 is connected to the current output terminal P84. A cathode of the diode 802 is connected to a contact point between the capacitor 805 and the inductor 806 and an anode of the diode 802 is connected to a contact point between the other end of the inductor 804 and the second current output terminal P85.

A modified sepic current converting circuit in which the inductor 804 is replaced with a transformer having the same magnetizing inductance as the inductor 804 includes the switch 801, the diode 802, the capacitor 803, the transformer (not shown), the capacitor 805 and the inductor 806.

The capacitor 803 is connected in parallel with the current input terminals P81 and P82. One end of the switch 801 is connected to the current input terminal P81 and the switch 801 operates in response to a switching signal being inputted through the current control terminal P83. One end of the inductor 806 is connected to the current output terminal P84. One end of the capacitor 805 is connected to the other end of the inductor 806. A cathode of the diode 802 is connected to a contact point between the capacitor 805 and the inductor 806. An anode of the diode 802 is connected to the current output terminal P85. The transformer (not shown) is constituted by an input port of which one end is connected to the other end of the switch 801 and the other end is connected to the current input terminal P82 and an output stage of which one end is connected to the other end of the capacitor 805 and the other end is connected to the current output terminal P85.

Another modified cepic current converter in which the capacitor 805 is replaced with capacitors having capacitance two times as large as the capacitor 805 connected in series with each other and a transformer is inserted into a serial connecting point between the capacitors includes the switch 801, the diode 802, the capacitor 803, a transformer (not shown), a first capacitor (not shown), a second capacitor (not shown) and the inductor 806.

The capacitor 803 is connected in parallel with the current input terminals P81 and P82. One end of the switch 801 is connected to the current input terminal P81 and the switch 801 operates in response to a switching signal being inputted through the current control terminal P83. One end of the inductor 804 is connected to the other end of the switch 801 and the other end of the inductor 804 is connected to a contact point between the current input terminal P82 and the capacitor 803. One end of the inductor 806 is connected to the first capacitor (not shown) and the current output terminal P84 of which one end are connected to a contact point between the switch 801 and the inductor 804. A cathode of the diode 802 is connected to the second capacitor (not shown) of which one end is connected to the other end of the inductor 806 and a contact point between the second capacitor (not shown) and the inductor 806 and an anode of the diode 802 is connected to the current output terminal P85. The transformer (not shown) is constituted by an input port of which one end is connected to the other end of the first capacitor and the other end is connected to the current input terminal P82 and an output stage of which one end is connected to the other end of the second capacitor and the other end is connected to the current output terminal P85.

The inventive concept can embody a direct current input terminal system having characteristics of low EMI noise and high energy efficiency through less power conversion steps by combining new GaN and SiC power semiconductor device having nano-second speed switching characteristic with a new energy source technology having a constant current output characteristic such as a solar cell, a storage battery and a fuel cell.

The inventive concept can be applied to a home appliance, an information technology device, a LED illumination, a high performance multiprocessor computer and a high sensitive and high performance national defense system.

In a solar cell which is an earth's fundamental energy source, an area in which an output power characteristic of the solar cell operates as a constant current source is larger than an area in which an output power characteristic of the solar cell operates as a constant voltage source. In this sense, a solar cell has a constant current source characteristic. As the inventive concept provides a safe, convenient and effective constant current source input terminal technology, it can prepare for a forthcoming renewable energy popularization time.

The power supply device of the inventive concept provides a supply using a constant current source in which resistance loss and radiation noise due to an electromagnetic interference (EMI) in a power supply feeding line are low. Thus, the power supply device of the inventive concept can be used in a supply as an illumination of a light emitting diode (LED)/an organic light emitting diode (OLED) which is an environment-friendly illumination of a high light emitting efficiency, a supply of a multiprocessor computer including high performance processors that need a low driving voltage and a high driving current and an environment-friendly direct current power supply such as a large scale internet data center (IDC). The power supply device of the inventive concept can use a solar cell as a current source. An area in which an output power characteristic of the solar cell operates as a constant current source is larger than an area in which an output power characteristic of the solar cell operates as a constant voltage source.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A serial load constant current source direct current power supply system comprising:
   a power supply unit comprising a constant current source outputting a direct current;
   a power supply feeding line connected to the constant current source;
   a constant current load having the same rated current characteristic as the constant current source;
   a buck current converter converting a current flowing through the power supply feeding line into a load current of a buck load that has a rated current characteristic smaller than that of the constant current source;
   a boost current converter converting the current flowing through the power supply feeding line into a load current of a boost load that has a rated current characteristic greater than that of the constant current source;

a buck-boost current converter converting the current flowing through the power supply feeding line into a load current of a buck-boost load that has a rated current characteristic greater or smaller than that of the constant current source;

first to third current converting controllers controlling the buck, boost, and buck-boost current converters, respectively; and a protection circuit for protecting the buck, boost, and buck-boost current converters and the constant current source;

wherein the power supply feeding line supplies a direct current to the constant current load, the buck current converter, the boost current converter, and the buck-boost current converter that are connected in series through the power supply feeding line.

2. The serial load constant current source direct current power supply system of claim 1, wherein the protection circuit comprises an overvoltage breaker connected in parallel with the constant current source.

3. The serial load constant current source direct current power supply system of claim 1,
wherein the protection circuit comprises at least one overvoltage breaker connecting one node located on the power supply feeding line and a ground point.

4. The serial load constant current source direct current power supply system of claim 1, wherein the protection circuit comprises an overvoltage breaker connected in parallel with input terminals of the constant current source and supplies a direct current to each of the constant current load, the buck current converter, the boost current converter, and the buck-boost current converter.

5. The serial load constant current source direct current power supply system of claim 1, wherein the protection circuit comprises an over current breaker connected in series with the constant current source.

6. The serial load constant current source direct current power supply system of claim 1, wherein the protection circuit comprises an over current breaker connected in series with input terminals of the constant current source and supplies a direct current to each of the constant current load, the buck current converter, the boost current converter, and the buck-boost current converter.

7. The serial load constant current source direct current power supply system of claim 1, further comprising a supply switch connected in parallel with to input terminals of each of the constant current load, the buck current converter, the boost current converter and the buck-boost current converter.

8. The serial load constant current source direct current power supply system of claim 1, wherein each of the first to third current converting controllers comprises:
a control circuit receiving current converter operational information and operation control information;
a latch storing or outputting a signal for designating a modulation operation initial value being outputted through the control circuit;
a first summer generating an error signal from a target voltage and a measurement voltage being outputted from the control circuit or generating an error signal from a target current and a measurement current being outputted from the control circuit;
a variable gain amplifier performing a variable gain control on the error signal according to a control of the control circuit;
an integrator integrating the variable gain-controlled error signal;
a first fixed gain amplifier performing a gain control on the integrated error signal to a size previously set;
a second fixed gain amplifier performing a gain control on the error signal to a size previously set;
a second summer adding up output signals of the first and second fixed gain amplifiers;
a third summer adding up a signal for designating an operation initial value of a pulse-width modulation (PWM) modular-output from the latch and an output signal of the second summer to output a modulation control signal for a PWM modulation operation;
a peak limiter controlling a peak value of the modulation control signal; and
a PWM modulator generating a pulse-shaped switching signal using the modulation control signal of which a peak value is limited.

9. The serial load constant current source direct current power supply system of claim 8, wherein the control circuit generates a signal designating an operation initial value of the PWM modulator using an amplitude of a bipolar sawtooth-shaped waveform and an output/input current transfer inverse function of a corresponding current converter among the buck, boost, and buck-boost current converters.

10. The serial load constant current source direct current power supply system of claim 8, wherein the control circuit determines the gain of the variable gain amplifier in proportion to a value obtained by dividing the power supply feeding line current by the target current or a value obtained by dividing the power supply feeding line current by the target voltage.

11. The serial load constant current source direct current power supply system of claim 1, wherein the first to third current converting controllers comprise:
a buck current converting controller generating a switching signal for controlling the buck current converter;
a boost current converting controller generating a switching signal for controlling the boost current converter; and
a buck-boost current converting controller generating a switching signal for controlling the buck-boost current converter.

12. The serial load constant current source direct current power supply system of claim 1, wherein the buck-boost current converter comprises:
first and second current input terminals which are connected to the power supply feeding line and supplied with a supply power;
first and second current output terminals which are connected to the buck-boost load and output a rated current converted from the power supply feeding line current; and
a current control terminal receiving a switching signal from the third current converting controller.

13. The serial load constant current source direct current power supply system of claim 12, wherein the buck-boost current converter further comprises:
a first capacitor connected in parallel with the first and second current input terminals;
a switch of which one end is connected to the first current input terminal, the switch operating in response to a switching control signal inputted through a switch control terminal;

a first inductor of which one end is connected to the other end of the switch and the other end is connected to a contact point between the second current input terminal and the first capacitor;

a second capacitor of which one end is connected to a contact point between the switch and the first inductor;

a second inductor of which one end is connected to the other end of the second capacitor and the other end is connected to the first current output terminal; and a diode of which a cathode is connected to a contact point between the second capacitor and the second inductor and an anode is connected to a contact point between the other end of the first inductor and the second current output terminal.

14. The serial load constant current source direct current power supply system of claim 12, wherein the buck-boost current converter further comprises:

a first capacitor connected in parallel with the first and second current terminals;

a switch of which one end is connected to the first current input terminal, the switch operating in response to a switching control signal inputted through a switch control terminal;

a first inductor of which one end is connected to the first current output terminal;

a second capacitor of which one end is connected to the other end of the first inductor;

a diode of which a cathode is connected to a contact point between the second capacitor and the first inductor and an anode is connected to the second current output terminal; and a transformer constituted by an input port of which one end is connected to the other end of the switch and the other end is connected to the second current input terminal and an output stage of which one end is connected to the other end of the second capacitor and the other end is connected to the second current output terminal.

15. The serial load constant current source direct current power supply system of claim 12, wherein the buck-boost current converter further comprises:

a first capacitor connected in parallel with the first and second current input terminals;

a switch of which one end is connected to the first current input terminal, the switch operating in response to a switching signal inputted through a switch control terminal;

a first inductor of which one end is connected to the other end of the switch and the other end is connected to a contact point between the second current input terminal and the first capacitor;

a second capacitor of which one end is connected to a contact point between the switch and the first inductor;

a second inductor of which one end is connected to the first current output terminal;

a third capacitor of which one end is connected to the other end of the second inductor;

a diode of which a cathode is connected to a contact point between the third capacitor and the second inductor and an anode is connected to the second current output terminal; and a transformer constituted by an input port of which one end is connected to the other end of the second capacitor and the other end is connected to the second current input terminal and an output stage of which one end is connected to the other end of the third capacitor and the other end is connected to the second current output terminal.

* * * * *